(12) United States Patent
Fellmann et al.

(10) Patent No.: US 10,207,720 B2
(45) Date of Patent: Feb. 19, 2019

(54) DEVICE FOR DRIVING AT LEAST ONE OUTPUT SHAFT OF A RAIL VEHICLE AND METHOD FOR OPERATING SUCH A DEVICE

(71) Applicant: ZF Friedrichshafen AG, Friedrichshafen (DE)

(72) Inventors: Martin Fellmann, Passau (DE); Bernd Somschor, Tettnang (DE); Kazutaka Iuchi, Markdorf (DE); Marton Kurucz, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 153 days.

(21) Appl. No.: 15/112,828

(22) PCT Filed: Dec. 15, 2014

(86) PCT No.: PCT/EP2014/077715
§ 371 (c)(1),
(2) Date: Jul. 20, 2016

(87) PCT Pub. No.: WO2015/110223
PCT Pub. Date: Jul. 30, 2015

(65) Prior Publication Data
US 2016/0348762 A1   Dec. 1, 2016

(30) Foreign Application Priority Data

Jan. 23, 2014   (DE) .................. 10 2014 201 237

(51) Int. Cl.
*B61C 9/38*   (2006.01)
*B61C 15/14*   (2006.01)
*F16H 3/54*   (2006.01)

(52) U.S. Cl.
CPC ............... *B61C 9/38* (2013.01); *B61C 15/14* (2013.01); *F16H 3/54* (2013.01);
(Continued)

(58) Field of Classification Search
CPC ... B61C 9/38; B61C 15/14; F16H 3/44; F16H 3/54
See application file for complete search history.

(56) References Cited

U.S. PATENT DOCUMENTS 7,276,015 B2   10/2007  Stervik
8,591,370 B2 *  11/2013  Yang ..................... F16H 3/724
                                                              475/149

FOREIGN PATENT DOCUMENTS

DE     474 973    3/1929
DE   1 901 931    9/1969
(Continued)

OTHER PUBLICATIONS

German Search Corresponding to 10 2014 201 237.6 dated Aug. 21, 2014.
(Continued)

*Primary Examiner* — Erin D Bishop
(74) *Attorney, Agent, or Firm* — Davis & Bujold PLLC; Michael J. Bujold

(57) ABSTRACT

A device (1) to drive at least an output shaft (3) of a rail vehicle with a drive engine (4). The at least one output shaft (3) can be brought into an operational connection with a wheel (2), and a transmission assembly (6) is positioned on the drive side of the at least one output shaft (3). At least two gear ratios can be presented in the area of the transmission assembly (6). In addition, a method is described for operating such a device (1).

5 Claims, 2 Drawing Sheets

(52) U.S. Cl.
CPC ............... *F16H 2200/0034* (2013.01); *F16H 2200/2005* (2013.01); *F16H 2200/2033* (2013.01); *F16H 2200/2064* (2013.01); *F16H 2200/2094* (2013.01)

(56) References Cited

FOREIGN PATENT DOCUMENTS

| | | |
|---|---|---|
| DE | 20 25 555 A1 | 12/1971 |
| DE | 603 04 685 T2 | 4/2007 |
| DE | 10 2006 043 227 A1 | 3/2008 |
| DE | 10 2008 047 992 A1 | 12/2009 |
| DE | 10 2011 109 113 A1 | 2/2013 |
| EP | 1 199 237 A1 | 4/2002 |
| JP | 2002-095110 A | 3/2002 |

OTHER PUBLICATIONS

International Search Report Corresponding to PCT/EP2014/077715 dated Mar. 6, 2015.

\* cited by examiner

DEVICE FOR DRIVING AT LEAST ONE OUTPUT SHAFT OF A RAIL VEHICLE AND METHOD FOR OPERATING SUCH A DEVICE

This application is a National Stage completion of PCT/EP2014/077715 filed Dec. 15, 2014, which claims priority from German patent application serial no. 10 2014 201 237.6 filed Jan. 23, 2014.

FIELD OF THE INVENTION

The invention concerns a device to drive at least one drive shaft of a rail vehicle with a drive engine and a method to operate such a device.

BACKGROUND OF THE INVENTION

To drive rail vehicles which have been designed in low-floor construction, several concepts are known in the practice, whereby one distinguishes between designs where a drive engine is assigned to each wheel, and in designs where several wheels are driven by a drive engine. The latter designs include cross coupled as well as longitudinally coupled systems, whereby in cross coupled systems two wheels are each assigned to an axle, and in longitudinally coupled systems, two wheels are assigned to one side of the rail vehicle, and adjacent to each other in the longitudinal direction of the vehicle, are driven by a drive engine. The drive engines work hereby each through a transmission assembly with an output shaft. Such a design is shown for a single wheel drive in DE 47 49 73 A.

However, disadvantageously, drive engines of these designs can only be operated with a lower efficiency, since the drive engines are not operated in the main operating ranges of rail vehicles and in their efficiency optimum ranges.

SUMMARY OF THE INVENTION

Therefore, the object of the presented invention is to provide a device for driving a rail vehicle, in which the drive engine can be operated with a high efficiency. It is also the object of the invention to provide a method for operating a device having at least two drive engines, each for driving at least one drive shaft, through which shift sequences in the area of drive engines and their transmission assemblies, with reference to the transferred torque during a shifting sequence, can be improved.

In accordance with the invention, this object is achieved with a device and a method as described below.

In this inventive device to drive at least one output shaft of a railway vehicle with a drive engine, the at least one output shaft with the at least one wheel can be brought in operative connection, on the drive side of a transmission assembly that is at least arranged with gear mechanism.

In accordance with the invention, at least two gear ratios can be shown in the area of the transmission assembly.

The drive engine of the inventive devices can be, in comparison to the known designs of the transmission assembly, operated with just one fixed gear ratio having a higher efficiency. This is accomplished by at least two different gear ratios, in the area of the transmission assembly, that are available or selectable, since on one hand the startup procedures, and on the other hand operating ranges with higher drive speeds, can be realized with their optimal operating ranges of the drive engine. Thus, the operating cost can be reduced advantageously with a little effort as compared to known assemblies. Furthermore, in each case the drive torque, which needs to be provided by the electric machine, can be realized through the variable gear ratio of the transmission assembly, compared to conventional devices, in a smaller form and therefore as a drive engine with lower costs.

If the drive engine of the inventive device, like the drive engines known from practice, has similar dimensions, a larger pull force value needs to be available, depending on each of the selected gear ratio of the transmission assembly in defined operating stages. Hereby, a higher traction force can be provided as a function of the respectively selected transmission stage of the transmission device in certain operating conditions of a rail vehicle.

The transmission assembly can be designed with two, three, four, or also more gear ratios, whereby the gear ratio stage of the transmission assembly with the largest driven ratio is preferably designed as a direct gear.

The output shaft can be in particular coupled with a single wheel so that a so-called single wheel drive is present. As an alternative, the output shaft can on both sides be in an operating connection with a wheel so that an axle, which is created by the output shaft, can be driven by the drive engine.

In a further, advantageous embodiment of the inventive device, preferably of a so-called cross coupled system, two output shafts, each with a wheel, can be driven by the drive machine, whereby the output shafts, in reference to the drive direction of the rail vehicle, are assigned to different sides of the rail vehicle, and are essentially and in particular positioned coaxially with each other. The output shafts, each forms a wheel shaft, and can hereby be coupled, in particular, directly or via an additional transmission assembly, with a transmission assembly which selects the different gear ratio stages.

Besides the switchable transmission assembly, a differential can be provided in the area of the output shafts which is arranged in particular in the area of the switchable transmission assembly.

Furthermore, besides cross coupled systems, the drives of longitudinally coupled systems can also be presented with the inventive device. In that case, two output shafts which are each operationally connected with a wheel, can be driven by the drive engine, whereby the output shafts, in reference to a drive direction of the rail vehicle have a neighboring offset against each other on one side of the rail vehicle, and are positioned in particular parallel to each other. The output shafts or wheel shafts, respectively, which are directly connected with the wheels are hereby preferably coupled with each other by at least one shaft, that is positioned in the longitudinal direction of the rail vehicle, whereby the switchable transmission assembly is, for instance, positioned in the area of the shaft or shafts, respectively.

In a constructively simple design of the device, the transmission assembly is at least designed with a planetary transmission or rather a planetary gearset, whereby the planetary transmission is, for instance, designed as a minus planetary transmission or as a plus planetary transmission. In particular, a gear ratio stage which has the largest drive portion during the drive operation of a rail vehicle is designed as a direct gear. Alternatively to the design with a planetary transmission, the transmission assembly can, for instance, include several spur gear stages or bevel gear stages. To shift the transmission assembly between different gear ratio stages, a shift element is provided which can be actuated by an actuating device.

Shifting of the transmission assembly between the at least two gear ratio stages can be accomplished in an advantageous further embodiment of the invention by means of a shift element which can be actuated under load, whereby the shift element is in particular designed as friction type shift element, for instance as a multi-disc clutch.

As an alternative or in addition to the above, at least a claw shift element can be provided for shifting the transmission assembly between the at least two gear ratio stages, whereby a shift operation in such a transmission assembly goes along with a tractive force interrupt.

In order to present a gear ratio between the driveshaft of the drive engine and the respective output shaft, advantageously to adapt the performance parameters of the drive engine, in an advantageous embodiment of the inventive device, an additional transmission assembly with a fixed gear ratio is provided at the drive side and/or the output side of the transmission assembly. The additional transmission assembly can, for instance, be designed with a spur gear stage, at least a planetary transmission, or at least as a bevel gear stage.

To achieve a possible wear-free shift procedure, in particular with a tractive force interrupted, shiftable transmission assembly between different gear ratio stages, an advantageous embodiment of the device provides at least a rotational speed sensor to capture the rotational speed of the shift element halves of the shift elements of the transmission assembly, whereby it can be provided that at least the one rotational speed sensor is positioned in the area of an output shaft and/or in the area of a drive shaft which is driven by the drive engine. The at least one rotational speed sensor is preferably operationally connected with at least one control device so that the drive engine can be operated depending on the captured, calculated rotational speed.

The drive engine is designed in an advantageous embodiment of the invention as a hydraulic machine or as an electric machine, for instance as an asynchronous motor, or as a permanent magnet excited motor.

In an advantageous embodiment of the inventive device, at least two output shafts are provided each of which can be driven by a drive engine and which are operationally connected with a wheel, whereby on the drive side of the output shaft, a transmission assembly is positioned to constitute at least two gear ratio stages. Hereby, in particular in the area of each driven axle or output shaft, respectively, of a bogie of a rail vehicle, each desired gear ratio stage can be shifted and a drive engine can be applied which is optimized accordingly.

To provide for each drive condition an advantageous torque induction for the output shafts of the device, a control device is provided in an advantageous embodiment of a device, in accordance with the invention, which is or are, respectively, designed for a separate actuation of different axles of drive engines.

In addition, a method to operate such a device is described and it is proposed, in accordance with the invention that different shiftable transmission assemblies, where each has at least an output shaft with an operationally connected wheel, and can be operated in a way so that shifting in the area of a transmission assembly between different gear ratio stages, are processed at least partially through a timing offset in reference to a shift procedure of an additional transmission assembly between different gear ratios stages.

The inventive method allows for the execution of an optimized shift procedure of different transmission assemblies with regard to the transferred torques of all output shafts of the device during the shift procedure, because the at least partial timing offset of the different shift procedures of the different transmission assemblies does not reduce all the transferred torque during the shift procedures in the area of a transmission assembly in an unwanted scale, and a sufficient torque is being transferred. The shift procedures of different transmission assemblies can time-wise be completely decoupled from each other. Thus, a possibility exists that a shift procedure of a transmission device can only be processed at the time when actually no other shift procedures are active in an additional transmission device or rather the transmission devices. All shifting procedures of transmission assemblies of the device can accordingly be processed sequentially whereby, depending on the operating stage, timely overlapping of shift procedures in the area of different transmission assemblies can be provided.

In an advantageous further embodiment of the inventive method, it is provided that the respective drive engines assigned to the output shafts are operated in such a way that during the execution of a shift procedure of a shiftable transmission assembly, torque is increased and is transferred by at least of one drive engine which is assigned to another transmission assembly. A sum of torque which is transferred by different drive engines to several output shafts, is partially compensated and preferably maintained as constant, during the execution of a shift procedure of a transmission assembly, by increasing torque transferred to the other output shaft.

It is hereby provided that during an operational sequence, in which an output shaft receives no or a reduced torque due to an actually processed shift procedure in the area of an assigned transmission assembly, that the additional drive engines of a rail vehicle which are assigned to additional output shafts, are accordingly actuated to provide the required drive torque of a rail vehicle. When the shift procedure of the transmission assembly is completed, the increased torque which has been provided by each of the of the drive engines for the assigned output shafts, can now be reduced again to the desired extent.

In the same way, the respective drive shafts which are assigned to the output shafts can be operated in such a way that, during a short malfunction of transferred torque in the area of an output shaft, for instance as the wheel, which is assigned to the output shaft, spins or rather slips, the transferred torque of a drive engine of another transmission assembly is increased such that a sum of the torque which is transferred by all drive engines to several output shafts of a rail vehicle is mainly kept constant in that operating condition.

Rotational speed compensation between output shafts of an axle can be achieved with the inventive method, when at least two drive engines which are provided for the of two, in particular and mainly coaxially positioned to each other, at two different sides of the rail vehicle, are operated in a way that the output shafts which are in an operating connection with a wheel, and driven by the respective drive engine, are driven with different rotational speeds, depending on the state of operation. Hereby, the function of a common axle differential can be provided through the drive engines and a reduced wear of wear-free drive in tight curves is made possible.

To execute in a simple way the synchronization, prior to the actuation of a shift element, in the area of the shift elements of a shiftable transmission assembly, for instance of a form fit shift element, the assigned drive engine which is assigned at least to an output shaft can be operated in a way, when a difference and the rotation speed is present between the shift element halves, that the difference of the rotation speed in the area of the shift element is adjusted to a value which is lower than a predetermined value, so that the shift element can safely be brought from its disengaged operating condition into an engaged operating condition. In addition, a synchronization which takes place prior to the engaging procedure is also all advantageous in friction-type shift elements, since the friction-type shift element can mainly be added in as load free and without losses.

In particular, it can be provided in shiftable transmission assemblies which have at least a claw shift element that, beginning with an engaged condition of the claw shift element, initially load torque is transferred by a drive shaft of the drive engine and that the driveshaft, if necessary, is briefly rotated in the opposite direction to execute a decoupling of the shift elements. Before bringing the shift elements from a decoupled state to an engaged state of the shift element halves, a rotational speed can be set for the shift element half which is operationally connected with the driveshaft which is mainly the rotational speed of the other shift element half which is operationally connected with the drive engine so that the claw shift element can later be brought in a simple way into the engaged condition.

It is provided in an advantageous embodiment of the inventive method that a preselected strategy for shift procedures for a transmission assembly is stored in at least one control device. Through the pre-selection strategy, at least an actuation sequence with general conditions for the at least one shiftable transmission assembly is predetermined. Thus and in a simple way, a desired gear ratio stage, in particular for all shiftable transmission assemblies, can be entered for a known route profile with a reduced activation effort.

The characteristics which are presented in the claims, as well as the characteristics of the embodiment examples of the inventive device and the inventive methods are each for themselves or in any combination with each other suitable to expand the matter. The respective combinations of characteristics present, regarding expansion of the matter in the invention, no limitation but have mainly just an exemplary character.

BRIEF DESCRIPTION OF THE DRAWINGS

Additional advantages and advantageous embodiment of the inventive device and the inventive method arise from the patent claims, followed by references to the drawings and the principally described embodiment examples.

It shows.

DETAILED DESCRIPTION OF THE PREFERRED EMBODIMENTS

Figure 1:
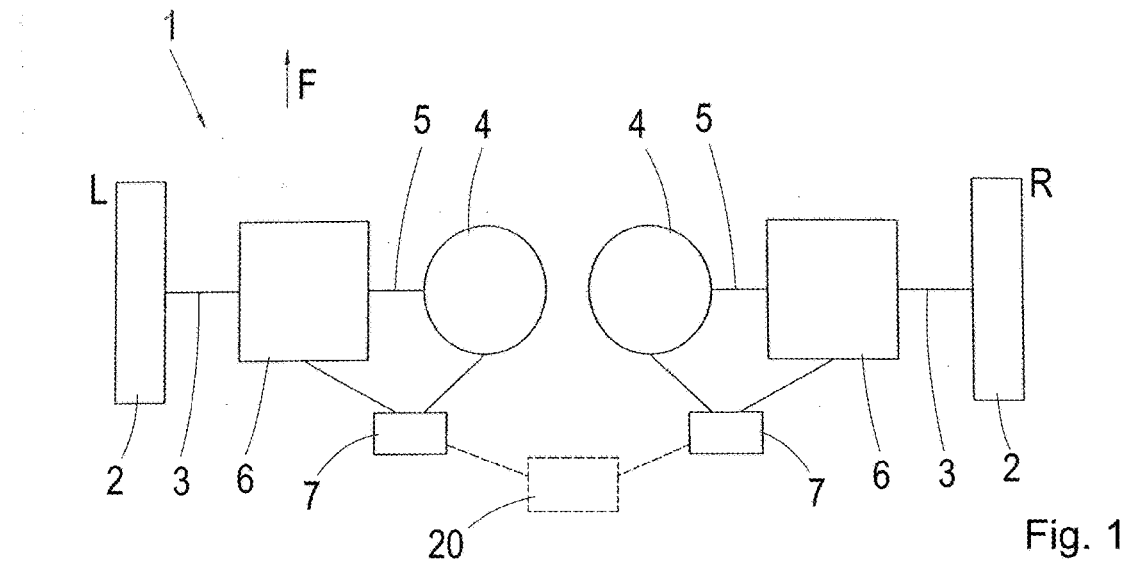
FIG. 1 a schematic diagram of a device of a rail vehicle to drive an output shaft, coupled with a wheel, with a drive engine, whereby a transmission assembly is positioned at the drive side of the output shaft.

FIG. 1 shows two devices 1 of a rail vehicle which is in V particular, completely designed in a low floor construction, and each device 1 can drive an output shaft 3, connected with a wheel 2, by V means of a drive machine which is here designed as an electric machine 4. The electric machine 4 is connected with a shiftable transmission assembly 6, which is coupled with the output shaft 3 at the output side thereof, via a drive shaft 5 which is present between two different gear ratios. The electric machine 4 and the transmission assembly 6 are positioned coaxially in reference to the wheel 2 but can, in alternative embodiments, also positioned axially offset or angularly offset from each other.

For shifting the transmission assembly 6 between the different gear ratios, an actuating, remote control device 7 is provided, which also, in the present case, can actuate the electric machine 4, which is designed with an inverter.

Figure 2:
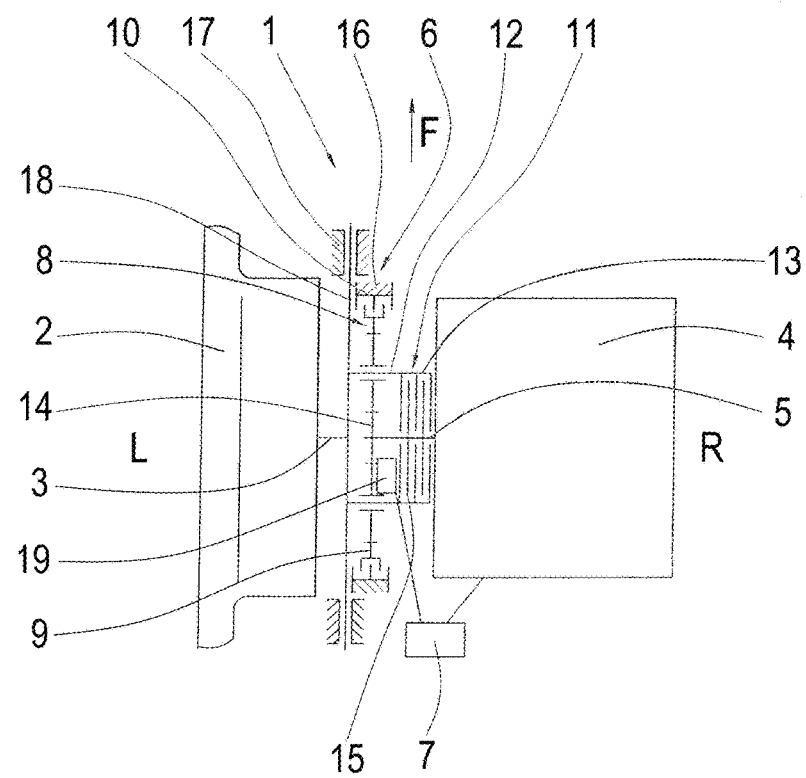
FIG. 2 showing a simplified constructive embodiment of the device in FIG. 1 with a shiftable transmission assembly with a planetary transmission and a multi-disc clutch.

In FIG. 2 the device 1 of FIG. 1 become more apparent. The transmission assembly 6 is here designed with a minus-planetary transmission 8 which is driven by the electric machine 4 and is connected, on the output side, with the output shaft 3. For shifting between two gear ratio stages, the planetary transmission 8 operates together with a brake 10, which is coupled with a ring gear 9, and a shift element which is positioned at the drive side of the planetary transmission 8 and which is designed as a multi-disc clutch 11. A planetary carrier 12 of the planetary transmission 8 is hereby coupled with an outer multi-disc carrier 13 of the multi-disc clutch 11, and a sun gear 14 of the planetary transmission 8 is coupled with an inner multi-disc carrier 15 of the multi-disc clutch 11, each of these fixed in a rotationally fixed manner.

For actuating the multi-disc clutch 11, the control device 7 is provided to actuate the actuating device 19. The actuating device 19 is run, for example, by a servomotor driven ball-ramp system, but it can also be, in principal, designed in any manner and be activated for instance, electrically, pneumatically, hydraulically, and/or mechanically.

Two gear ratio stages can be adjusted with the planetary transmission 8, whereby a high gear ratio or rather a first gear is actuated when the brake 10, also actuated by the control device 7, is engaged and the ring gear 9 is locked in reference to a housing 16 and when the multi-disc clutch 11 is in a disengaged operating state, and when the outer multi-disc carrier 13 is rotatably coupled with the inner multi-disc carrier 15. A low gear ratio or rather a second gear is then actuated in the transmission assembly 6, when the brake 10 is disengaged and the ring gear 9 is rotatable with respect to the housing 16, while the multi-disc clutch 11 is engaged and the outer multi-disc carrier 13 is connected in a rotationally fixed manner with the inner multi-disc carrier 15.

To implement a desired total gear ratio in the transmission assembly 6 in both an engaged first gear ratio as well as engaged second gear ratio, an alternative embodiment of the device provides that, at the drive side and/or output side of the transmission assembly, at least an additional transmission assembly is positioned with a fixed or a variable gear ratio.

Furthermore, deceleration of the output shaft 3 is provided by a brake 17, which comprises a disc 18 that is connected, in a rotationally fixed manner, with the output shaft 3. In principle, the brake 17 can be designed in any manner other than is shown in FIG. 2 and, depending on the actually available installation space, can also be positioned elsewhere and, optionally, it can possibly be combined with other parts to form a module.

With one wheel 2, the transmission assembly which is assigned to the wheel 2, and the associated electric machine 4 with the converter, can each be designed as separate units, or as a single module, or can be combined in any way as smaller modules, whereby the parts in the modules can be at least partially and functionally integrated. Thus, it can be provided, for instance, that the transmission assembly 6 is incorporated in the wheel 2, or that the electric machine 4 and the transmission assembly 6 form one structural unit. In addition, there is also the possibility to provide a separate inverter for each of the electric machines 4, or that a central inverter is provided through which several electric machines 4 can be operated.

To drive all of the wheels 2 of a bogie of a rail vehicle with the device 1, the device 1 has in particular three additional output shafts, each of the output shafts being connected with an V additional wheel, wherein, in the drive direction F of the rail vehicle, in particular, two wheels are each assigned to a left vehicle side L, as well as to the right vehicle side R, FIG. 1 showing only one wheel on each of the vehicle sides. Like the output shaft 3, the additional three output V shafts each have an electric machine, a shiftable transmission assembly, and a decentralized control device. The possibility exists that the decentralized control devices 7 are each V operationally connected with a central control device 20, as shown in V dashed lines in FIG. 1.

During the operation of the rail vehicle, the shiftable transmission assemblies 6 of the device 1 are operated by the central control device and the decentralized control devices 7 as follows, to provide, in the area of the device 1, at least approximately a requested total drive torque and, in particular, without traction force interruption.

Starting from the operational stage of the device 1, in which, in the area of the transmission assembly 6 the first gear ratio is engaged, with a request for engagement of the second gear ratio in the area of the transmission assembly 6, the shifting in the area of the transmission assembly 6 is initially executed, while no gear ratio change takes place in the additional transmission assemblies 6 and the first gear ratio is still engaged. Thus, via the additional transmission assemblies 6, a torque, created by the drive engines, can be provided in the respectively converted value, and in the area of the respectively assigned wheels.

To keep the requested total torque as constant as possible during the shift sequence in the area of the one transmission assembly, in the area of the wheels 2 and the device 1, the electric machines 4 are actuated by the control devices 7 in such a way that, if a traction force interruption is present in the actual shifting transmission assembly 6, it is compensated by an increase of drive power of the currently unactuated transmission assemblies and their assigned electric machines.

After completion of the shift operation in the first actuated transmission assembly 6 by way of the transmission assembly 6 which is now engaged in the second gear ratio, torque can then be supplied again to the assigned wheel 2 via the transmission assembly 6 of the electric machine 4. For this reason, the drive power of the other electric machines on the control side are again reduced to adjust the total torque of the device 1 continuously at least approximately to the requested level.

Thereafter, the requested gear ratio changes are executed in the area of the additional transmission assemblies of the bogie, starting from the first gear ratio in the direction of the second gear ratio, whereby the drive power of the electric machines are adjusted in the previously described manner, to set the total torque of the device 1 during the sequentially executed shiftings in the desired way. AH shifting processes of the four transmission assemblies 6 are, in this present and described variation of the inventive method, sequentially executed without the a time overlap. Thus, it is guaranteed in a simple way that in particular, during traction force interrupted shiftings in which in each case a claw shift element participates, the total torque of the device 1 can be brought to or rather adjusted to a requested level.

Also, the variable actuation of the electric machines 4 of the device 1 and the torques actually transferred to the respective wheels 2, allow, for instance, that in an operating stage in which slippage occurs in the area of one or more wheels 2 of the bogie, and can in the area of this wheel or these wheels where no or only a reduced torque can be supported, a total torque can be set in the area of the device 1 through an increase of the drive power of one or several electric machines which are each not assigned to slipping wheels, to get to the requested level or rather adjust to that level.

In addition, driving of rail vehicles through tight curves is possible by means of the device 1, if, for instance, two electric machines 4 of the device 1, which are each designed for opposite vehicle sides L and R, have output shafts 3, which are coaxially positioned with each other, which are each actuated by the assigned control units 7 and/or the central control unit, such that the output shafts 3 are driven at different rotation speeds in such curve driving.

Also, the electric machines 4 can be operated in a way that synchronization, at least of a shifting element 11 of one of the transmission assembly 6, in particular a claw shift element, can be executed. Here, for instance, the electric machine 4, with disengaged shift element halves 13, 15, is operated in a way that a rotational speed difference between the shift element halves 13, 15 of the shift element 11 of the shiftable transmission assembly 6 is adjusted to a value which is lower than a predetermined value, in particular to a rotational speed difference near zero. For the determination of an actual current rotational speed difference of the shift element halves 13, 15, a rotational speed sensor can be positioned in the area of the shaft which needs to be synchronized, in particular in the area of the output shaft 3 and/or in the area of the driveshaft 5, respectively, whereby the rotational speed of the driveshaft 5 can also be determined, if necessary, directly through the electric machine 4.

To reduce the actuation effort of the shiftable transmission assemblies 6 and the electric machines 4 when driving a rail vehicle which is equipped with a bogie and which has a device 1 to drive four wheels 2, a preselection strategy for shift sequences can be stored in particular in the central control device or in all transmission assemblies 6 of the device 1. The preselection strategy can, for known route profiles and depending on the respective position of the rail vehicle, be provided for the route profile with the respective gear ratio stage preferably for all shiftable transmission assemblies 6, whereby in particular sensors are provided to determine the actual position of the rail vehicle for each of the route profiles which need to be driven.

Figure 3:
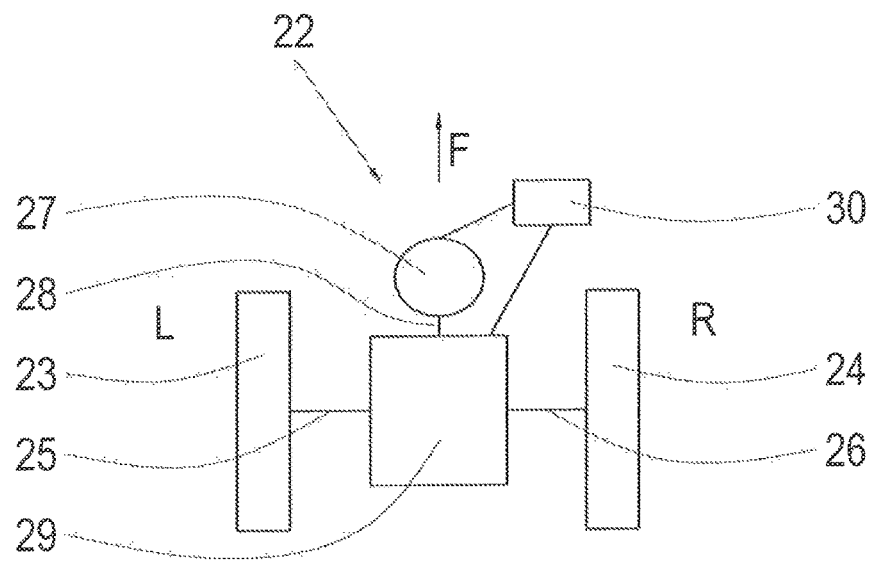
FIG. 3 a schematic diagram of an alternatively designed device of a rail vehicle in which, by means of a drive engine, two output shafts are driven and which are each connected with a wheel and are mainly coaxially positioned towards each other through inserting a transmission assembly.

An alternative embodiment of the device 22 is shown in FIG. 3 which is designed with two the output shafts 25, 26 each being connected to a wheel 23, 24. This is a so-called cross coupled system in which two wheels 23, 24, assigned to opposite sides L, R of the rail vehicle, are driven by a single drive engine 27. The drive engine, which is again designed as an electric machine 27, is operationally connected by way of a drive shaft 28 with a transmission assembly 29, presented here in a highly schematic manner, which has two possible gear ratios available. Drive torque of the electric machine 27 is transferred through the transmission 29 equally in the direction of the output shafts 25, 26.

The transmission assembly 29 has at least one shift element which can shift between the different, in particular the two gear ratio stages. For actuating the shift element of the transmission assembly 29, an actuation device is provided which can be actuated by a control device 30, which is also provided for control and/or regulation of the electric machine 27.

In contrast to the device 1 which is shown in FIG. 1 and FIG. 2, in accordance with the device 22 of FIG. 3, a gear ratio is changed through a shift process of the transmission assembly 29 between the drive shaft 28 of the electric machine 27 and the two output shafts 25, 26.

Figure 4:
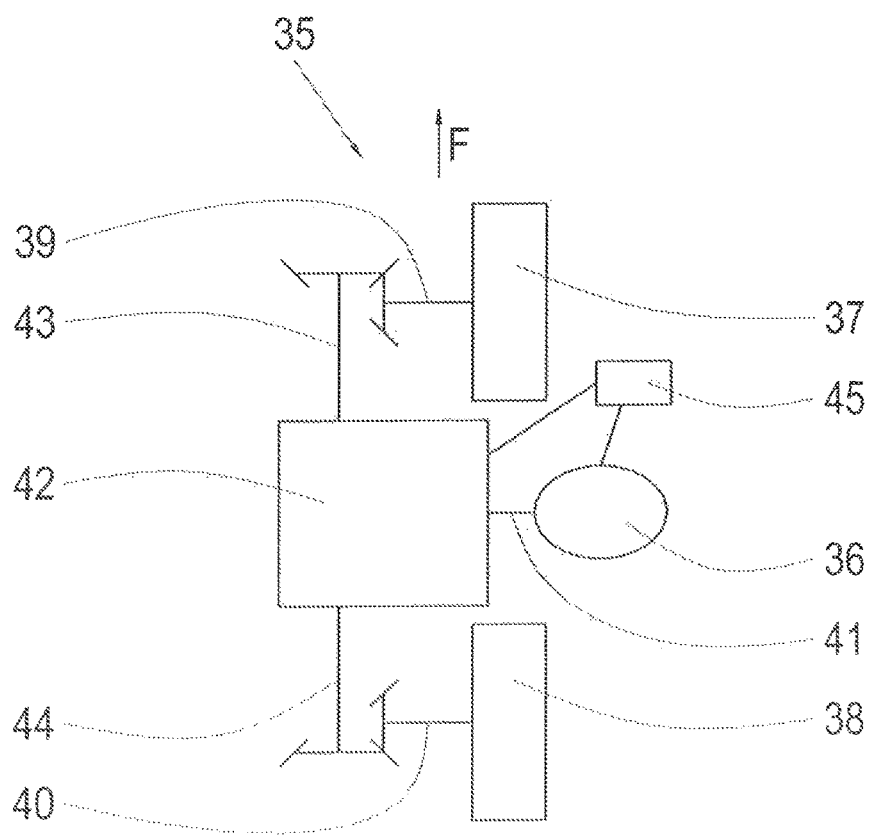
FIG. 4 a schematic diagram of an additional, alternatively designed device of a rail vehicle, in which two output shafts and each connected with the wheel, longitudinally positioned in the drive direction of the rail vehicle with an offset to each other, can be driven by a drive engine.

Another alternate embodiment of the device 35 is shown in FIG. 4. By means of an electric machine 36 which is designed as the drive engine, two output shafts 39, 40 are driven and which are each connected to a wheel 37, 38, wherein the wheels 37, 38 of the device 35 are positioned on one vehicle side L or R, this being a so-called longitudinally coupled system.

The electric machine 36 operates, via a drive shaft 41, with a transmission assembly 42 which can be shifted between several gear ratios and is equipped with at least one shift element, wherein the drive torque of the electric machine 36 is transmitted via two intermediate shafts 43, 44, which extend, in particular, in the longitudinal direction of the rail vehicle, and differential gear- or rather cardan shafts, each having a bevel gear on the output shafts 39, 40 in the present case.

For carrying out a shifting operation, in the area of a transmission assembly 42, a control device with a shift element 45 is again provided, wherein the shift element can be displaced by actuating an actuator device between an engaged and disengaged state. Also the electric machine 36 can here be actuated by means of the control device 45.

Beside the transmission assemblies 29 or 42, respectively, the devices 22, 35 can have an additional transmission assembly with a constant gear ratio, which can be assigned, on the drive side, to the transmission assembly 29 or 42, respectively, and the output shaft 25 and/or 26, or the output shaft 39, respectively, and or 40. An embodiment of the transmission assemblies 29, 42 and also shifting in the area of the transmission assemblies between the different gear ratio stages can be provided as described in the manner in particular as in FIG. 1 and FIG. 2.

A bogie of a rail vehicle can have in particular a device 22 with two electric machines 27 which are operationally connected with a shiftable transmission assembly 29, where in each case two wheels 23, 24 can be driven. As an alternative hereto, a bogie of a rail vehicle can also have a device 35 with electric machines 36, each of which are operationally connected with a shiftable transmission assembly 42, where in each case two wheels 37, 38 which are designed for a vehicle side L, R of the rail vehicle, can be driven. Such devices 22, 35 can be actuated in a similar manner as the device 1, so that also torque compensation and a synchronization can be executed in the same manner with the devices 22, 35. In addition, each control unit 30, 45 can have stored, as described above in detail, a preselected strategy for the transmission assemblies 29, 42. Differential adjustment of the rotations speeds of the wheels on different vehicles sides L, R of the respective bogie, when driving through tight curves, is possible.

REFERENCE CHARACTERS

1 Device
2 Wheel
3 Output Shaft
4 Drive Engine; Electric machine
5 Drive Shaft
6 Transmission Assembly
7 Control Device
8 Planetary Transmission
9 Ring Gear
10 Brake
11 Multi-disc Clutch
12 Planetary Carrier
13 Outer Multi-disc Carrier (housing)
14 Sun Gear
15 Inner Multi-disc Carrier
16 Housing
17 Brake
18 Disc
19 Actuator Device
22 Device
23 Wheel
24 Wheel
25 Drive Shaft
26 Drive Shaft
27 Drive Engine; Electric machine
28 Drive Shaft
29 Transmission Assembly
30 Control Device
35 Device
36 Drive Engine; Electric machine
37 Wheel
38 Wheel
39 Drive Shaft
40 Drive Shaft
41 Drive Shaft
42 Transmission Assembly
43 Intermediate Shaft
44 Intermediate Shaft
45 Control Device
F Drive Direction
L Left Side
R Right Side

The invention claimed is:

1. A method of operating a rail vehicle with at least first and second devices, the first device having a drive shaft which is driven by at least one electric machine, at least one output shaft, at least one wheel, and at least one transmission assembly with at least one shift element, the at least one transmission assembly of the first device is operationally connected to and positioned at a drive side of the at least one output shaft of the first device, the at least one output shaft of the first device is at least operationally connected with the at least one wheel of the first device, and the at least one shift element of the first device is operable such that by way of the at least one transmission assembly of the first device, at least two gear ratios are implementable between the drive shaft of the first device and the at least one output shaft of the first device, the at least one transmission assembly of the first device is a planetary transmission, and the at least one electric machine of the first device, the at least one transmission assembly of the first device, and the at least one wheel of the first device are positioned coaxially relative to one another, the second device having a drive shaft which is driven by at least one electric machine, at least one output shaft, at least one wheel, and at least one transmission assembly with at least shift element, the at least one transmission assembly of the second device is operationally connected to and positioned at a drive side of the at least one output shaft of the second device, the at least one output shaft of the second device is at least operationally connected with the at least one wheel of the second device, and the at least one shift element of the second device is operable such that by way of the at least one transmission assembly of the second device, at least two gear ratios are implementable between the drive shaft of the second device and the at least one output shaft of the second device, the at least one transmission assembly of the second device is a planetary transmission, and the at least one electric machine of the second device, the at least one transmission assembly of the second device, and the at least one wheel of the second device are positioned coaxially relative to one another, the method comprising:

actuating the at least one transmission assembly of the first device and the at least one transmission assembly of the second device such that a gear ratio change of the at least one transmission assembly of the first device is at least partially executed with a timely offset in reference to a gear ratio change of the another at least one transmission assembly of the second device.

2. The method according to claim 1, further comprising actuating the at least one electric machine of the first device and the at least one electric machine of the second device, which are assigned to the at least one output shaft of the first device and the at least one output shaft of the second device, respectively, in a way that during execution of a shift process of the at least one transmission assembly of the first device, torque which is transferred from the at least one electric machine of the second device to the at least one transmission assembly of the second device, is increased.

3. The method according to claim 1, further comprising actuating the at least one electric machines of the first device and the at least one electric machine of the second device such that the at least one output shaft of the first device and the at least one output shaft of the second device are driven at different rotational speeds, dependent on an operating state, the at least one electric machine of the first device driving the at least one output shaft of the first device, which is operationally connected to the at least one wheel of the first device, on a first side of the rail vehicle, and the at least one electric machine of the second device driving the at least one output shaft of the second device, which is operationally connected to the at least one wheel of the second device, on a second side of the rail vehicle.

4. The method according to claim 1, further comprising actuating the at least one electric machine of the first device, which is assigned to the least one output shaft the first device, when a difference of rotational speeds is present between first and second shift element halves of the at least one shift element of the at least one transmission assembly of the first device with a request for an operating connection of the first and the second shift element halves, such that the difference of the rotational speeds between the first and the second shift element halves is adjusted to a value which is lower than a predetermined value.

5. The method according to claim 1, further comprising storing, in a control unit, an at least partially predetermined pre-selected strategy for shift processes for at least one of the at least one transmission assembly of the first device and the at least one transmission assembly of the second device.

* * * * *